Sept. 1, 1936.   J. DE VONEY   2,052,872
VALVE FOR VACUUM SEALING APPARATUS
Filed Nov. 14, 1934   4 Sheets-Sheet 1
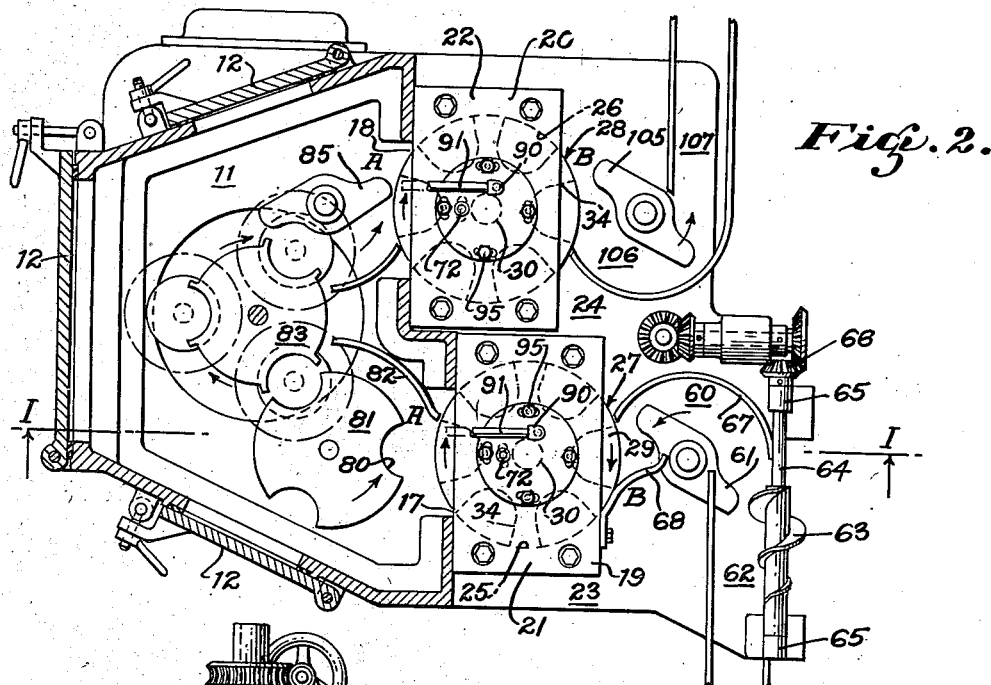

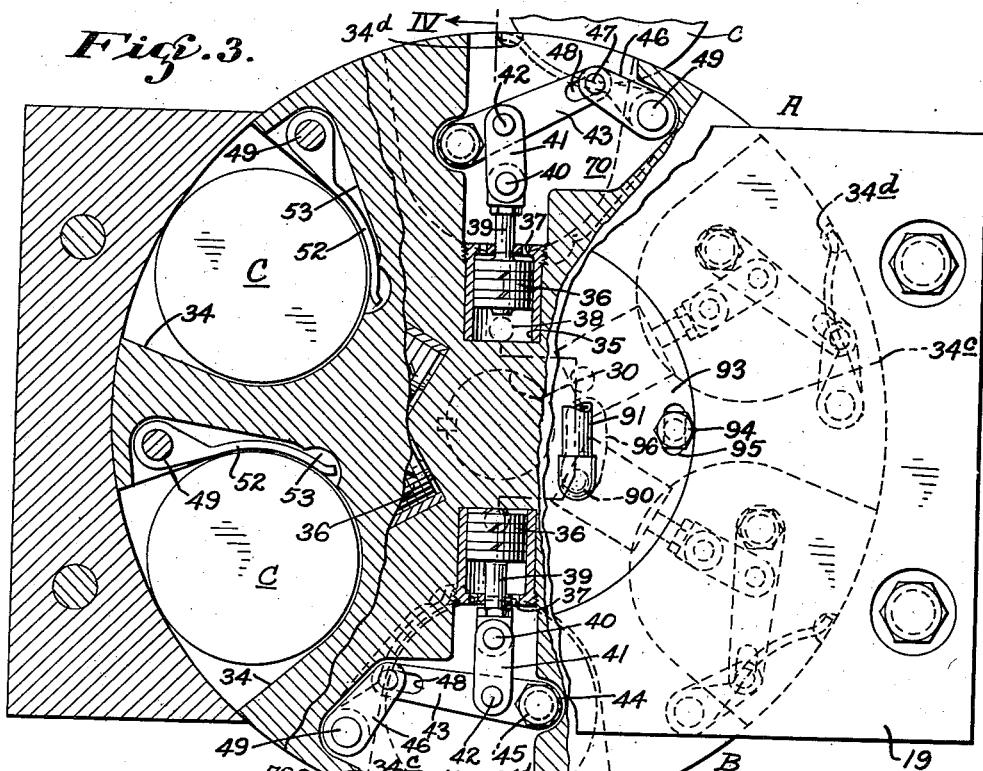

Sept. 1, 1936. J. DE VONEY 2,052,872
VALVE FOR VACUUM SEALING APPARATUS
Filed Nov. 14, 1934 4 Sheets-Sheet 3

INVENTOR.
John De Voney
BY
ATTORNEY.

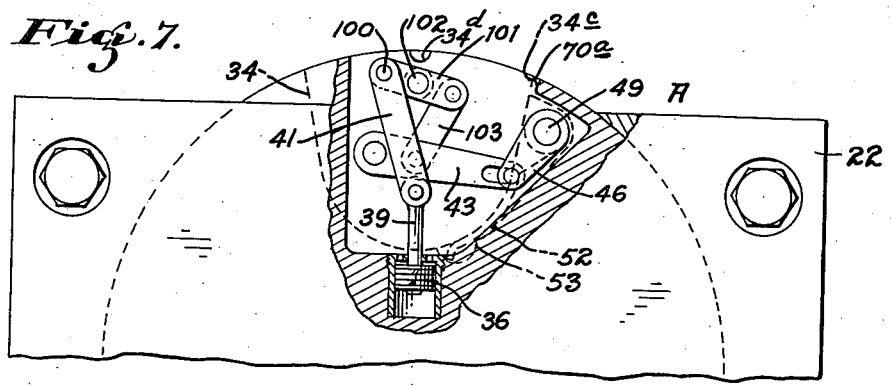
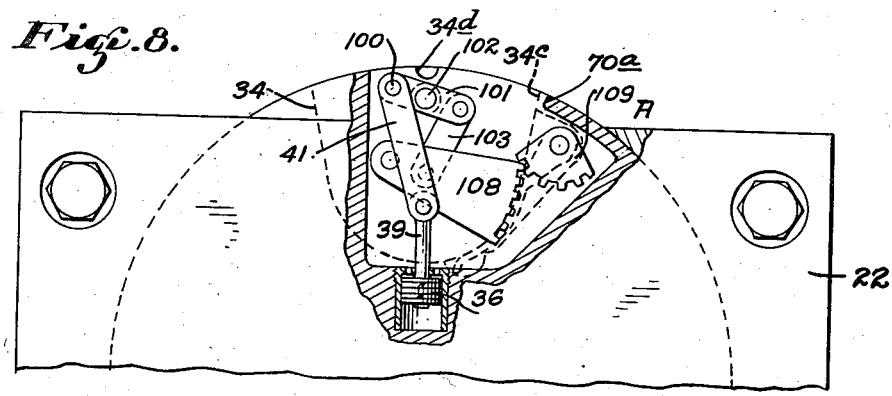
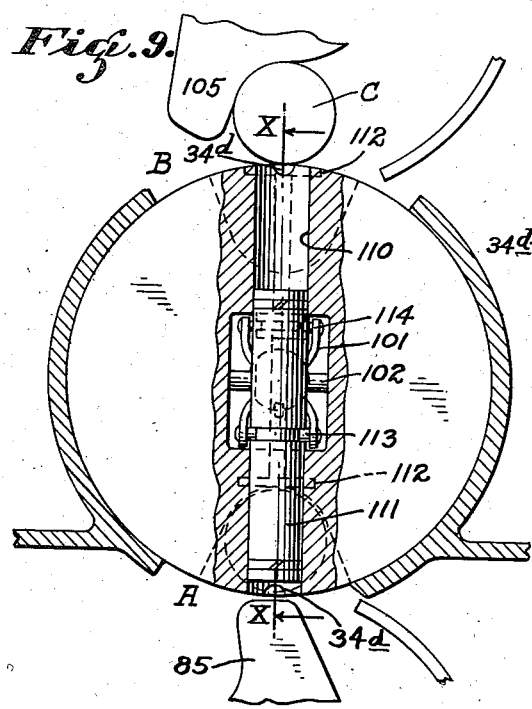
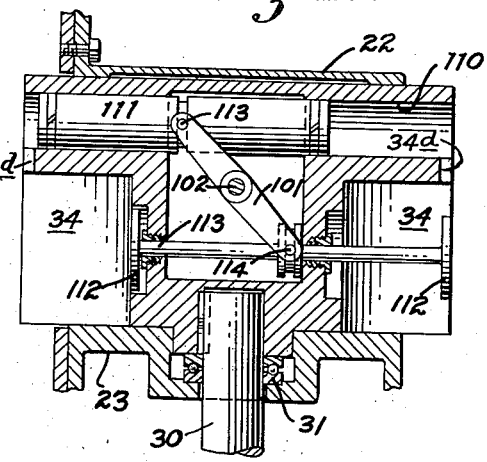

Patented Sept. 1, 1936

2,052,872

UNITED STATES PATENT OFFICE 2,052,872

VALVE FOR VACUUM SEALING APPARATUS

John De Voney, San Francisco, Calif., assignor to Pacific Can Co., San Francisco, Calif., a corporation of Nevada Application November 14, 1934, Serial No. 752,992

12 Claims. (Cl. 198—209)

This invention relates to valves for sealing apparatus for containers, and more particularly to the structure of a valve for such apparatus in which differential of air pressure actuates means for transferring containers into and out of a sealing chamber, wherein pressure is greater or less than atmospheric.

Among the objects of the invention are to provide a novel valve in sealing apparatus; to provide a valve for such apparatus which may be operated by differential of air pressure; to provide a valve in such apparatus wherein the ratio of movement of an ejector means is increased relative to the movement of the mechanism which actuates the ejector, and generally to improve on valves of this character.

With the foregoing and other objects in view, all of which will be more apparent as this description proceeds, the invention consists in the novel construction and combination of parts hereinafter described, illustrated in the accompanying drawings, and pointed out in the claims hereto appended, it being understood that various changes in the form, proportion, size and details of construction of the apparatus may be resorted to within the scope of the appended claims, without departing from the spirit or sacrificing any of the advantages of the invention.

For convenience of explanation, the invention is entitled and described with relation to a vacuum sealing apparatus, but it will be obvious that if it is desired that a container be sealed under conditions of pressure above atmospheric in the sealing chamber, proper variations of mechanism may be made as further mentioned herein.

To more clearly comprehend the invention, reference is directed to the accompanying drawings in connection with the written description and in which:—

Fig. 1 is a vertical section on line I—I of Fig. 2.

Fig. 2 is a transverse section on line II—II of Fig. 1.

Fig. 3 is an enlarged view of a detail of the valve structure partly in section and partly broken away to show structure at various elevations.

Fig. 4 is a vertical transverse sectional view on line IV—IV of Fig. 3.

Fig. 7 is a fragmentary plan view partly in section showing modification of valve of Fig. 3 from an inlet valve to an outlet valve.

Fig. 8 is a fragmentary plan view partly in section showing modification of valve of Fig. 5 from an inlet to an outlet valve.

Fig. 9 is a horizontal transverse view partly in section showing modification of valve of Fig. 6 from inlet to outlet valve.

Fig. 10 is a vertical section on line X—X of Fig. 9.

Figure 5:
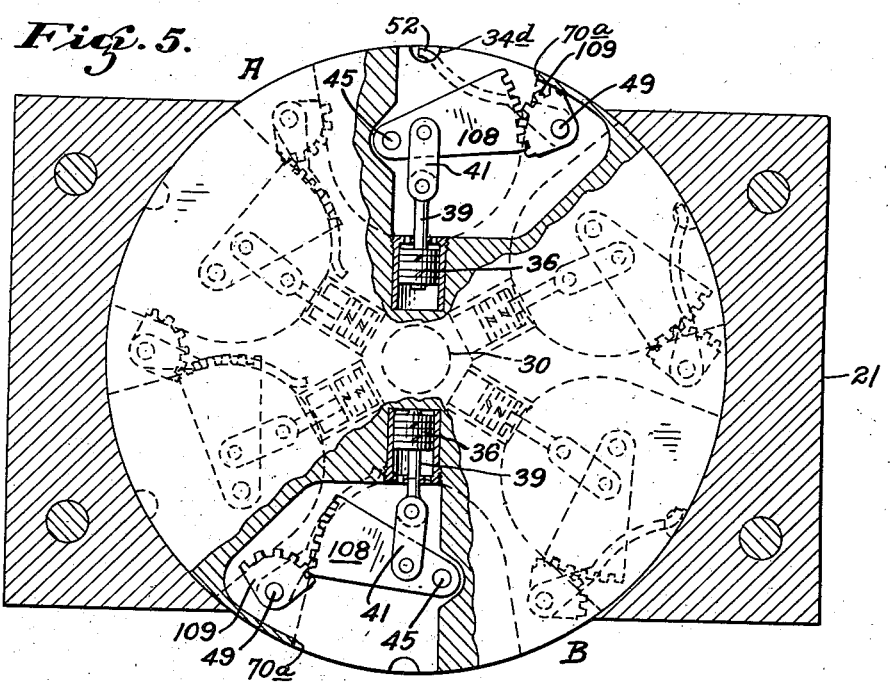
Fig. 5 is an enlarged transverse horizontal view in section showing a detail of a modification of the valve structure.

Referring first to Figs. 1 to 4, inclusive, of the drawings in which like reference characters indicate corresponding parts, 10 indicates generally a base, superposed on which is a housing of a vacuum chamber 11 of any suitable design which may have doors 12 through which access may be had to the interior of the vacuum chamber. The vacuum chamber is provided with a suitable vacuum pump which communicates with the interior of the vacuum chamber as at 14 and serves to maintain a pressure in the chamber less than atmospheric, thus providing within the chamber a degree of vacuum sufficient for the usual canning operations. Within the vacuum chamber 11 is an apparatus generally indicated 15 for sealing closure members on containers while the containers are in the vacuum chamber and are subject to the removal of air from the container due to the less than atmospheric pressure in the chamber 11.

The sealing apparatus 15 may be of any of the well-known suitable types, the device illustrated herein being of the multiple turret, double seamer type well-known in the metal can art for hermetically sealing thin sheet metal covers to can bodies and deforming cooperating flanges one upon the other by means of encircling rollers such as indicated 16. Since the invention of this application does not reside in novel structural details of the sealing apparatus 15, it is believed sufficient to describe the sealing apparatus in a general way only, in connection with the description of the valve mechanism in which the invention resides.

The vacuum chamber 11 has an inlet opening 17 and an outlet opening 18 at each of which is a valve casing 19 and 20, each casing having a tightly sealed top 21, 22 and bottom 23, 24, the valve casings each having an opening therethrough, 25, 26 which are in communication with respective openings 17 and 18 of the sealing chamber 11, the casings 19, 20 having inner side walls arcuate in horizontal transverse section. Mounted within the respective openings 25, 26 through casing 19, 20 and in snug slidable contact with the arcuate side top and bottom walls thereof are respective valve structures indicated generally 27, 28. Since the mechanical parts of the valves 27, 28 may be, to a great extent, identical, it is thought sufficient explanation for those skilled in the art to describe one valve structure only, the valve 27 at the inlet opening 17 being used for illustrative purposes, and variations only in valve being separately described later.

The valve body 29 is cylindrical so that it may rotate within the valve casing 19 and in substantially air-tight slidable contact relation with the enclosing walls. One side of the valve body 29 is exposed to the source of vacuum in the chamber 11 at the opening 17, while the opposite side of the valve body is exposed at the opening 26 to atmospheric pressure. The valve body 29 is rotated by a shaft 30 and is supported upon an anti-friction bearing 31, receiving its motive power from any suitable source such as through gears 32, 33, and motor 33ª. The valve body 29 is provided with pockets 34, which are closed at the top by a wall 34ª, and which are closed at the bottom 34ᵇ by the bottom plate 23 of the valve casing. As indicated in the several views of the drawings, the valve in its entirety is of the nature of a turret and the pockets 34 are arranged circumferentially thereof, thus providing a plurality of separate spaced pockets. The valve body 29 has a side-wall recess 70 at the inner end of which is provided a cylinder chamber 35, and in the preferred form illustrated in Figs. 1 to 4, inclusive, a cylinder chamber 35 is provided for each pocket 34. Within the cylinder chamber 35 there is a reciprocable piston 36. One end of the cylinder chamber 35 has communication with its respective recess 70 through openings 37, and the opposite end of the cylinder chamber 35 also has an opening 38, the purpose of which will be further explained. The piston 36 has connected thereto at the end thereof adjacent the opening of its recess 70 a connecting rod 39 which has pivotal connection as at 40 to a link 41, the latter having its opposite end pivotally connected as at 42 to a lever arm 43 which has pivotal mounting as at 44 on a sub-shaft 45. The lever arm 43 is one arm of a toggle which is connected at its free end to a cooperating toggle arm 46 by the pivoted joint 47, preferably with a slightly elongated slot 48 to allow a degree of lost motion in the joint. The arm 46 is fixedly secured to a shaft 49, the latter being rotatably mounted as at 50 adjacent its upper end through the body of the top wall 34ª of the pocket, said shaft 49 being rotatably mounted at its lower end as at 51 in the body of the valve. Fixedly mounted to the shaft 49, preferably adjacent the lower portion thereof, is an ejector finger 52 which is arcuately actuated upon rotation of the shaft 49. The body 29 is recessed at each of the pockets as at 53 for the purpose of accommodating the shaft 49 and the ejector finger 52 so that the shaft and finger may be embedded in the valve body, and not lie in the plane of the pockets when a container is fully within the pockets, as clearly indicated in Fig. 3.

For convenience of further explanation, the side of the valve which is accessible to the vacuum chamber 11 is indicated A and the side of the valve which is accessible to atmospheric pressure is indicated B. At the side of the valve B there is provided a feed mechanism for containers which includes a platform 60 upon which the containers may be supported in transit. Overlying the platform 60 is a rotatable propeller 61 which receives the containers from a chute 62 in which the containers may be propelled and fed one-by-one by suitable means such as a thread of a worm drive 63 mounted on a shaft 64 which is journaled for rotation as at bearing 65 and which may be rotated by suitable means such as a series of shafts and gears generally indicated 66, the latter being motivated by any suitable power source.

Referring to the Figs. 1 to 4, inclusive, the mode of operation is as follows:—

Containers are fed through the chute 62 in successive one-by-one relation to the propeller arms 61 by which they are moved along the platform 60 within the guide rail 67, and being deflected into the successive pockets 34 by a guiding arm 68. When a pocket is at position B and ready to receive a container, the ejector finger 52 and the piston 36 are in the position shown at the side B of Fig. 3 so that the pocket is entirely clear to receive the container. Upon continued rotation of the valve body 29 a pocket with a container therein and still having atmospheric pressure therein, rotates around to the opening 17 of the vacuum chamber 11 at which point the cylinder chamber 35 which corresponds with that particular pocket communicates with the condition of vacuum in the chamber 11 through the openings 37 of the cylinder chamber and through the recess 70 in the valve body 29 in which the piston and its attendant mechanism operate. At this point the opening 38 registers with a conduit 71 which extends through the top plate of the valve casing and communicates with the atmosphere as at 72, which establishes a differential of pressures at opposite ends of piston 36, with atmospheric pressure being effective through opening 38, while a less than atmospheric pressure is effective at the opposite end of the piston, which is in communication with vacuum chamber 11, through openings 37. This condition causes the piston 36 to move toward the vacuum chamber. Upon this movement of the piston on a down stroke toward the vacuum chamber the respective link and levers 41, 43, and 46 are actuated from their position shown at position B in Fig. 3 to the position shown at position A in Fig. 3, thus rotatively rocking the shaft 49 which in turn arcuately swings the finger 52 and thereby ejects the container C from the pocket of the valve and into a pocket 80 of a transfer wheel 81 which upon rotation carries the can along a guard rail 82 and delivers it to a turret 83 for a sealing operation, the container C having been delivered to the valve with a closure member loosely disposed thereon, so that the air within the container is drawn therefrom as soon as the container reaches a point of communication with the vacuum chamber 11 and before the container has its closure member permanently sealed thereto on the sealing turret 83. It is preferred that the forward edge 70ª of the outer opening of recess 70 shall be in substantially vertical alignment with forward advancing vertical wall 34ᶜ of pockets 34 so that the pistons will be subjected to the influence of vacuum and atmosphere substantially simultaneously with the pockets. This may also be further accomplished by providing a communication opening 34ᵈ between pocket 34 and recess 70. There may be a plurality of sealing turrets 83, each of which rotates on its own axis and revolves about a common axis on a carrier turret 84. After the sealing operation the carrier turret 84 delivers the container to a rotatable propeller 85 which places the container in a pocket of the outlet valve 28 mounted at the outlet opening 18, the outlet valve and its casing at the outlet opening 18 being substantially similar in structure to the hereinabove described valve and casing 27 which are mounted at the inlet opening 17, but with certain further described modifications of structure and operation which adapt it as an outlet valve.

After a container has been fed from the inlet valve 27 into the vacuum chamber 11 the valve turret or body 29 of valve 27 continues to rotate, which necessarily terminates the communication between the interior of the cylinder with the atmosphere through opening 38 and the vent 72, but when the valve body 29 has continued its rotation sufficiently the port or opening 38 registers with a second opening 90 in the valve casing which communicates through a conduit 91 with the vacuum chamber as at 92, said communication being synchronized and timed to become effective substantially simultaneously with the pocket reaching one edge of opening 27 at the side B so that the pocket is subject to atmospheric pressure, thus establishing a differential of pressures on opposite ends of piston 36, and moving the piston to the opposite end of the cylinder responsive to the pressure differential. This reversal of the stroke of the piston 36 operates to move the links and levers 41, 43, 46, and thereby replace the ejector finger 52 in the recess 53, so that the pocket 34 is empty and ready to receive an additional container when it reaches the opening at position B. It is obvious from the drawings disclosing a plurality of pockets that the operation with respect to each pocket and its attendant mechanism is similar to the one pocket which has been described. It will be noted that centrally of the respective top plates 21, 22 there is a disc 93 which is separate from the top plate and that the openings or vents 72 and 90 are in the plate 93. The plate 93 is secured to the top plate by bolts 94 and the holes for receiving the bolt in the disc plate 93 are elongated as at 95 so that plate 93 is rotatively adjustable axially in order that adjustments may be made in the time when the opening 38 registers with the openings of ports 72 and 90, thus making it possible to adjust the timing of the stroke of the piston 36, and thereby adjust the time of action of the finger 52. The communication openings or ports 72 and 90 may be elongated as at 96 on the under side of the disc plate 93 so that when the disc plate is rotatively adjusted, communication may be provided with the opening 38 when at the adjusted position of the disc plate; and also in order that the respective effects of the vacuum suction and the communication with atmospheric pressure through the openings or ports 72, 90 will be of a sufficient period of time for the desired mechanical action to be accomplished.

Since in the preferred exemplification of the invention, the valve turret or body 28, 29, carries a plurality of pockets 34 each having its respective cylinder and piston, it is obvious that the length of the stroke of the piston is preferably less than the length of the arc which is swung by the free end of finger 53; otherwise, the longitudinal dimension of the cylinder 35 and stroke of piston 36 would have to be of such excessive length that it would be difficult to accommodate a plurality of piston units centrally of a single turret, unless the turret were made so excessively large as to be impractical, or at least undesirable, in view of the rapidity of rotation of the valve turret or body. For this reason the stroke of the piston 36 relative to the arcuate swing of the finger 52 is arranged with an inverse ratio through the links and levers 41, 43, 46, a ratio of one to five having been found from experience to be practical and efficient. In this manner a one inch piston stroke is effective to discharge a five inch can from the pocket 34.

The outlet valve at the opening 18 of the vacuum chamber may be substantially and generally similar in mechanical structure to the inlet valve body at inlet opening 17, with one exception. Since the inlet valve 27 discharges a container into the vacuum chamber on the side A, whereas the outlet valve 28 receives a container from the vacuum chamber on the side A and discharges it at the side B, it is necessary to reverse the action of the ejector fingers, that is, the ejector finger 52 of the outlet valve then lies in the recess 53 at the side A which is the receiving side of the outlet valve, (see Fig. 7), and said finger must be actuated to eject the container at the discharge side B of the outlet valve. To accomplish this reversal of movement of the ejector finger the connecting rod of the piston is connected by a lengthened link 41 to one end of a lever 101 as at 100, said lever 101 being centrally pivoted as at 102 on a one-to-one ratio, and an additional link 103 is pivotally connected between the opposite end of lever 101 and arm 43, thus maintaining the same ratio of movement between the piston 36 and finger 52 as in the inlet valve. Upon the down stroke of the piston 36 toward the periphery of the valve body responsive to the differential of pressure in the vacuum chamber as compared with the communication to atmospheric pressure through conduit 72 of the outlet valve, the lever arm 43 which is connected to the link 46 moves the finger 52 into the recess 53, at which time the propeller 85 moves a can into the empty pocket 34 which is at the opening 18 of the A side of the outlet valve. The outlet valve body 28 carrying the container in the pocket continues to rotate until the opening 38 of the cylinder registers with the opening 90 which has the vacuum connection thereto, and since the piston 36 has remained in its forward or down position up to this point, it is thereupon moved responsive to differential of pressure at its opposite ends in an up stroke to the top of the cylinder when the edge of pocket 34 begins to emerge from the valve casing and exposes the outer end of the cylinder to atmospheric pressure. By the time the pocket has reached a position opposite the blade 105 of the propeller for removal of the can, the piston 36 has completed its upward stroke in the cylinder which, because of the reversing mechanism, hereinabove described, ejects the can onto the platform 106 of the discharge chute 107 and the sealed container is conveyed to any suitable destination.

In the modification of the inlet valve shown in Fig. 5, the valve body including cylinder, piston, ejector finger and its actuating shaft, as well as the respective openings 72, 90 to vacuum and atmospheric pressures, and the valve casing, may all be similar to the valve of Fig. 3. The modification consists in connecting the link 41 to a quadrant gear 108 which is pivoted at 45 in the same manner as the arm 43 in Fig. 3, said quadrant gear intermeshing with a quadrant pinion 109 which is fixedly mounted on shaft 49. The outlet valve of this modification is shown in Fig. 8 and the reverse mechanical operation of the ejector finger is accomplished in identically the same manner as the reversal of movement is accomplished in Fig. 7.

Figure 6:
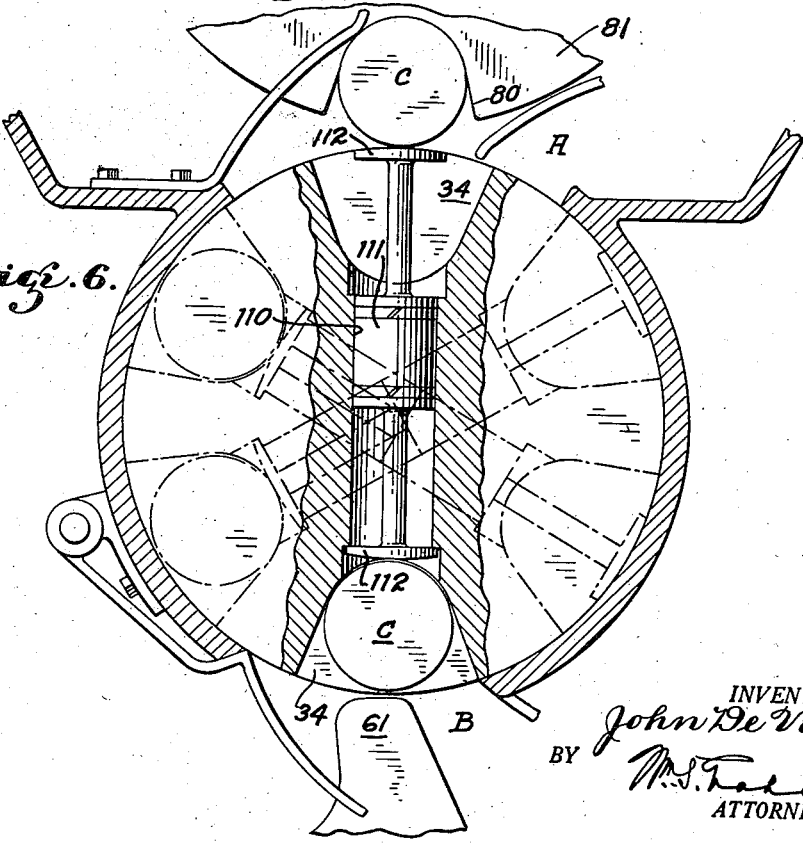
Fig. 6 is an enlarged view of a simplified modification of valve structure partly in section and partly broken away.

Fig. 6 discloses a modification of an inlet valve in which a single cylinder 110 extends through the valve body and communicates with opposite pockets 34. A single piston 111 is mounted for reciprocation in the cylinder and has extended ejectors 112 at its opposite ends. A container C is fed to the empty pocket 34 at the side B of the valve, and as the valve body is rotated as indicated in dot and dash lines in Fig. 6, and the pocket comes into communication with the vacuum chamber at the side A of the valve, the piston 111 is actuated in the direction of the vacuum chamber and discharges the container into the pocket 80 of transfer wheel 81, after which the sealing operation is accomplished in the usual manner within the vacuum chamber.

The discharge valve of this modification is shown in Figs. 9 and 10, it being necessary to reverse the effective operation of this modification in like manner with the reverse operative effect of the valves of Figs. 3 and 5. This reversal of operative effect is accomplished in the outlet valve by providing an ejector member 112 which is reciprocably mounted as at 113 through the central portion of the valve body, and has its respective ends lying in opposite pockets 34. In this modification the reversing lever 101 for accomplishing the reversal of movement is centrally pivoted as at 102, and has also pivotal connection centrally at 113 with the piston 11 and has pivotal connection centrally with the ejector member at 114. In this modification the ports 72 and 90 of Figs. 1 to 4 in the top plate of the valve casing and communicating with atmosphere and a vacuum source, respectively, may be eliminated since the movement of the piston is directly responsive to the source of vacuum in the vacuum chamber 11 at the A side of the valve and with the atmospheric pressure at the B side of the valve. In the valves of Figs. 9 and 10, the cylinder 110 may communicate with the pocket 34 through the opening 34<sup>d</sup> so that the piston in the cylinder will be subject to pressure to the same extent and simultaneously with the pocket.

In the operation of the valve in conjunction with apparatus intended for sealing containers under pressures greater than atmospheric, it would be necessary only to either reverse the operative position of the inlet valve and outlet valve, leaving the sealing mechanism as illustrated, or leave the inlet and outlet valves in positions as illustrated and reverse the operative sequence of the mechanism within the sealing chamber, but in either event changing the connections 14 and 90 to a source of pressure greater than atmospheric. For this reason the term "vacuum" as used in the description is generic to fluid pressures to avoid undue verbiage and is exemplary of one form of operation only, which, by reversal of operative parts, may include pressures greater than, as well as less than, atmospheric.

Having thus described by invention, what I claim and desire to secure by Letters Patent of the United States is:—

1. In an apparatus for transferring container bodies, a transfer valve including a rotatable valve body having pockets for receiving containers, means for moving a container from a pocket of said valve body, said means including a cylinder in the valve body and rotatable therewith, a reciprocable piston in the cylinder, an ejector member for pushing a container from the pocket, and a lever member connecting the piston and ejector member, in combination with means for rotating the valve body and means for subjecting the respective opposite ends of the cylinder chamber simultaneously to a differential of pressure whereby the piston is reciprocated in the cylinder.

2. In an apparatus for transferring container bodies, a transfer valve including a rotatable valve body having pockets for receiving containers, means for moving a container from a pocket of said valve body, said means including a cylinder in the valve body and rotatable therewith, a reciprocable piston in the cylinder, an ejector member for pushing a container from the pocket and a pivoted lever member connecting the piston and the ejector member whereby the piston and ejector member move simultaneously in opposite directions, in combination with means for rotating the valve body and means for subjecting the respective opposite ends of the cylinder chamber simultaneously to differential of pressure whereby the piston is reciprocated in the cylinder.

3. A transfer valve apparatus including a casing having an inlet and an outlet, a rotatable valve body mounted in said casing and having pockets for receiving containers, means for moving a container from a pocket of said valve body including a cylinder in the valve body and rotatable therewith, a reciprocable piston in the cylinder, an ejector member for pushing a container from a pocket and a lever member connecting the piston and ejector member, in combination with means for rotating the valve body and means for subjecting respective opposite ends of the cylinder simultaneously to a differential of pressure whereby the piston is reciprocated in the cylinder, said cylinder and ejector member being relatively spaced vertically with relation to the axis of rotation of the valve body.

4. In an apparatus for transferring container bodies, a transfer valve comprising a casing having an inlet opening and a discharge opening, a valve body snugly rotatable in the casing and provided with a plurality of relatively spaced pockets for containers, means for moving a container from a pocket of the valve body, including an independent cylinder for each pocket and a reciprocable piston in each cylinder, said cylinders each having a port at each of the opposite ends of the piston, means for rotating the valve body and means for simultaneously subjecting said opposite cylinder ports of a cylinder to a differential of fluid pressure whereby the piston is reciprocated in the cylinder, said cylinders being carried by the valve body and rotatable therewith.

5. In an apparatus for transferring container bodies, a transfer valve comprising a casing having an inlet opening and a discharge opening for respectively receiving and discharging containers, a cylinder valve body snugly rotatable in the casing and provided with a plurality of circumferentially spaced pockets for containers, means carried by and rotatable with the valve body for moving a container from a pocket of the valve body, said means including a cylinder for each pocket, a reciprocable piston in each cylinder, an ejector member and a lever connection means between the ejector member and the piston, said cylinders each having a port at each of the opposite ends of the piston, means for rotating the valve body and means for simultaneously subjecting the opposite cylinder ports of the respective cylinders to a differential of fluid pressure whereby the piston is reciprocated in the cylinder.

6. In an apparatus for transferring container bodies, a transfer valve comprising a casing having an inlet opening and a discharge opening for respectively receiving and discharging containers, said casing having a pair of separate vents to different fluid pressure sources, a cylindrical valve body snugly rotatable in the casing and provided with a plurality of circumferentially spaced pockets for containers, means carried by and rotatable with the valve body for moving a container from a pocket of the valve body, said means including a cylinder for each pocket, a reciprocable piston in each cylinder, an ejector member, and a lever connection means between the ejector member and the piston, said cylinders each having a port at each of the opposite ends of the piston, one of said ports being adapted for successively communicating with the separate vents of the casing, means for rotating the valve body, and means for subjecting the opposite cylinder ports of the respective cylinders to a differential of fluid pressures whereby the piston is reciprocated in the cylinder.

7. In an apparatus for transferring container bodies, a transfer valve comprising a casing having an inlet opening and a discharge opening for respectively receiving and discharging containers, a cylindrical valve body snugly rotatable in the casing and provided with a plurality of circumferentially spaced pockets for containers, means carried by and rotatable with the valve body for moving a container from a pocket of the valve body, said means including a cylinder for each pocket, a reciprocable piston in each cylinder, an ejector member and a lever connection means between the ejector member and the piston, said cylinders each having a port at each of the opposite ends of the piston, means for rotating the valve body and means for simultaneously subjecting the opposite cylinder ports of the respective cylinders to a differential of fluid pressures, said lever connection means including means for increasing the ratio of movement of the ejector member relative to the movement of the piston.

8. In an apparatus for transferring container bodies, a transfer valve comprising a casing having an inlet opening and a discharge opening for respectively receiving and discharging containers, said casing having a pair of separate vents to different fluid pressure sources, a cylindrical valve body snugly rotatable in the casing and provided with a plurality of circumferentially spaced pockets for containers, means carried by and rotatable with the valve body for moving a container from a pocket of the valve body, said means including an independent cylinder for each pocket, a reciprocable piston in each cylinder, an ejector member and a lever connection means between the ejector member and the piston, said cylinders each having a port at each of the opposite ends of the piston, one of said ports being adapted for successively communicating with the separate vents of the casing, means for rotating the valve body and means for simultaneously subjecting the opposite cylinder ports of the respective cylinders to a differential of fluid pressures, said lever connection means including means for increasing the ratio of movement of the ejector member relative to the movement of the piston.

9. In an apparatus for transferring container bodies, a transfer valve comprising a casing having an inlet opening and a discharge opening for respectively receiving and discharging containers, said casing having a pair of separate vents to different fluid pressure sources, a cylindrical valve body snugly rotatable in the casing and provided with a plurality of circumferentially spaced pockets for containers, means carried by and rotatable with the valve body for moving a container from a pocket of the valve body, said means including an independent cylinder for each pocket, a reciprocable piston in each cylinder, an ejector member and a lever connection means between the ejector member and the piston, said cylinders each having a port at each of the opposite ends of the piston, one of said ports being adapted for successively communicating with the separate vents of the casing, means for rotating the valve body, and means for simultaneously subjecting the opposite cylinder ports of the respective cylinders to a differential of fluid pressures, said cylinders and ejector members being relatively vertically spaced in the valve body.

10. In an apparatus for transferring container bodies, a transfer valve comprising a casing having an inlet opening and a discharge opening for respectively receiving and discharging containers, said casing having a pair of separate vents to different fluid pressure sources, a cylindrical valve body snugly rotatable in the casing and provided with a plurality of circumferentially spaced pockets for containers, means carried by and rotatable with the valve body for moving a container from a pocket of the valve body, said means including a cylinder for each pocket, a reciprocable piston in each cylinder, an ejector member and a lever connection means between the ejector member and the piston, said cylinders each having a port at each of the opposite ends of the piston, one of said ports being adapted for successively communicating with the separate vents of the casing, means for rotating the valve body, and means for simultaneously subjecting the opposite cylinder ports of the respective cylinders to a differential of fluid pressures, said cylinders and ejector members being relatively vertically spaced in the valve body, said lever connection means including means for increasing the ratio of movement of the ejector member relative to the movement of the piston.

11. In an apparatus for transferring container bodies, a transfer valve mechanism including a pair of rotatable valve bodies, one being for feeding containers and the other for discharging containers, and each having pockets for receiving containers, means carried by each of said valve bodies for moving a container from a pocket of the valve body, including a cylinder in the valve body and rotated therewith, a reciprocable piston in the cylinder, an ejector member for pushing a container from the pocket of the valve body, one of said valve bodies including a pivoted lever connection between the piston and ejector member whereby the piston and ejector member move simultaneously in opposite directions, means for rotating said valve bodies and means for subjecting the respective opposite ends of the cylinder chambers simultaneously to differential of pressure for reciprocating the piston in the respective cylinders.

12. A transfer valve apparatus including a casing having a pair of valve chambers therein, each chamber having an inlet and an outlet, a rotatable valve body mounted in each of said chambers and having pockets for receiving containers, means carried by each of said valve bodies for moving a container from a pocket of the valve body, including a cylinder in the valve body and rotatable therewith, a reciprocable piston in the cylinder, an ejector member for pushing a container from a pocket, and lever mechanism connecting the piston and ejector member, means for rotating said valve bodies in said chambers and means for subjecting respective opposite ends of the cylinder simultaneously to a differential of pressure for reciprocating the respective pistons in the cylinders, the lever mechanism of one of said valve bodies being adapted for moving the ejector member in the same direction as the movement of the piston of said valve body, and the lever mechanism of the other valve body being adapted for moving the ejector member in a direction opposite to the direction of movement of the piston of that valve body.

JOHN DE VONEY.